United States Patent

[11] 3,567,024

[72] Inventor Carl R. Mc Cormick
Penfield, N.Y.
[21] Appl. No. 852,846
[22] Filed Aug. 25, 1969
[45] Patented Mar. 2, 1971
[73] Assignee M. J. French Co., Inc.
Webster, N.Y.

[54] TRENCH FILTER
6 Claims, 5 Drawing Figs.
[52] U.S. Cl. .................................................. 210/164,
210/170, 210/332, 210/413, 210/456
[51] Int. Cl. ............................................ B01d 35/16,
B01d 29/42
[50] Field of Search ........................................ 210/413,
155, 159, 162, 248, 456, 73, 79, 66, 67, 171, 170,
332

[56] References Cited
UNITED STATES PATENTS
1,412,945 4/1922 Landreth ...................... 210/332
3,194,399 7/1965 Harms .......................... 210/413X Primary Examiner—Frank A. Spear, Jr.
Attorney—F. P. Keiper ABSTRACT: Industrial waste system having lateral lined trenches in a floor comprising spaced parallel side plates with downwardly and inwardly inclined lower sections joined to form a V bottom having a lengthwise gradient sufficient to promote flow of liquids and matter capable of suspension in the liquid from one end to a discharge point at the other end, side wall shoulders for supporting the side plates within the trench with the upper edges of the plates close to floor level, internal filtergrid support shoulders extending horizontally along the inside walls below floor level having filter grids thereon, power driven sprocket and chain means disposed on opposite sides of the side plates and extending substantially the length of the trench liner, carrying transverse scraper bars at a level to scrape the upper surface of the filter grids, and a similarly constructed trunk trench connecting the discharge ends of the lateral trenches, and means for collecting the liquids separate from the waste collected by the scraper bars.

INVENTOR.
CARL R. McCORMICK,
BY
ATTORNEY

INVENTOR.
CARL R. McCORMICK.
BY
ATTORNEY

PATENTED MAR 2 1971 3,567,024

INVENTOR.
CARL R. McCORMICK

BY

ATTORNEY

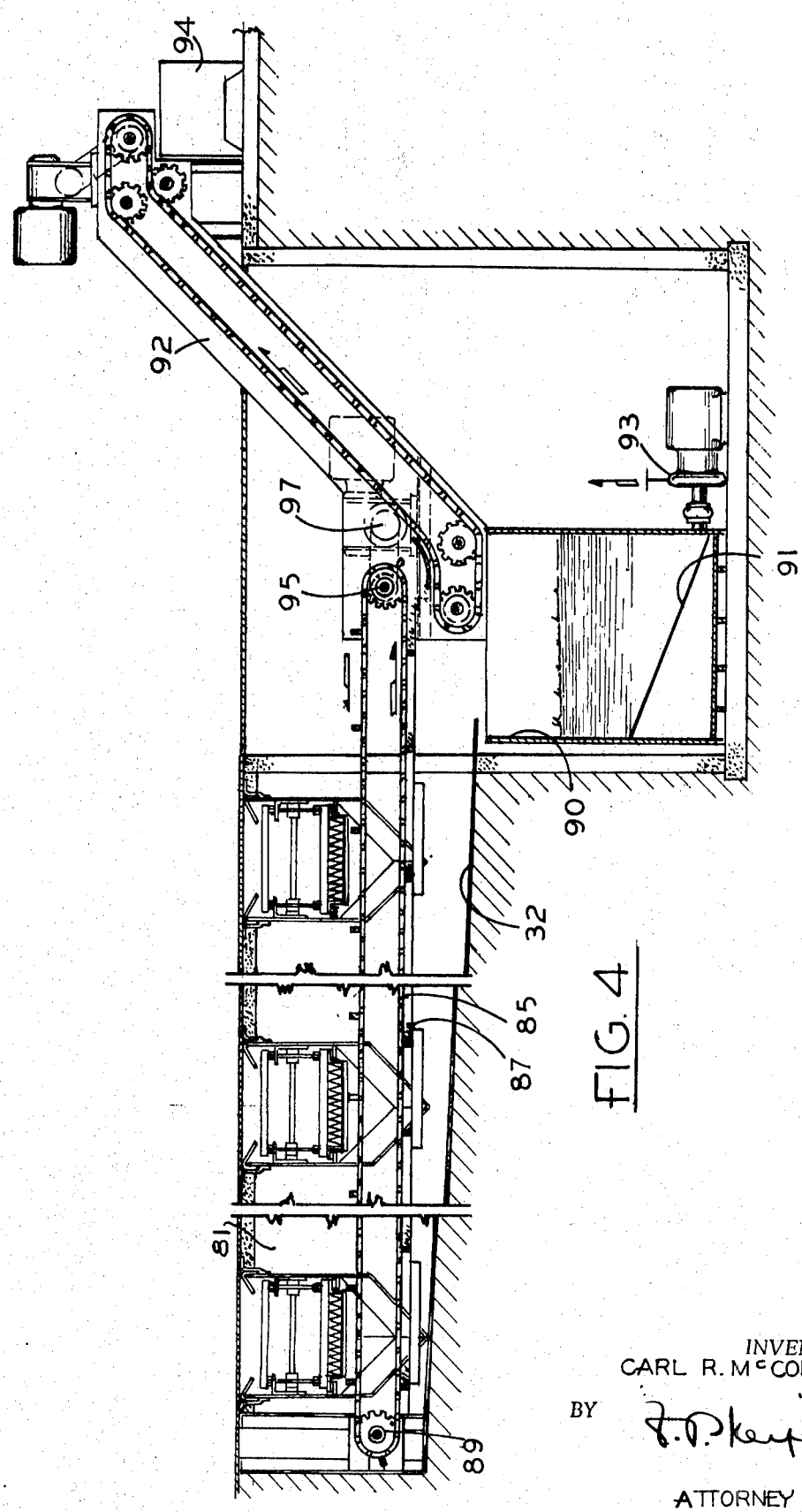

TRENCH FILTER

This invention relates to the handling of industrial waster particularly in relatively large automated plants.

In large manufacturing plants of the automated type, where machine tools are disposed in parallel rows and in proper sequence for handling a series of operations it is highly desirable to gather the waste such as cutting or cooling liquids, turnings, scrap paper, wrappers, etc., on a continuous or frequent intermittent basis, but with regularity so as to carry the waste from the area before such waste can accumulate. Heretofore, it has been proposed to provide trenches including laterals feeding into trunk line trenches in association with each machine tool lineup, having a relatively steep pitch whereby the liquid coolants and cutting oils and the like would flush the solids and carry the waste to a clarification apparatus so that oils and the like can be reclaimed for reuse. The length of machine tool lineups, however, necessitated extremely deep trenches due to the pitch necessary to assure flow of the liquids and solids.

The present invention is directed to an industrial waste handling system wherein relatively shallow trenches suffice, despite relatively long machine tool lineups. More particularly the invention has to do with providing such trenches, both lateral and trunk with screening mechanism such that the liquids and fine particles which do not impede flow are allowed to enter the trench with the liquids whereas larger waste solids are mechanically carried from the screening and moved mechanically to a common gathering point. The invention contemplates the use of screening in the trenches close to floor level, over which mechanical scrapers are employed to move the course swarf in the form of various solids. The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 4 is a sectional view through a trunk trench showing the end handling of the waste.

Figure 1:
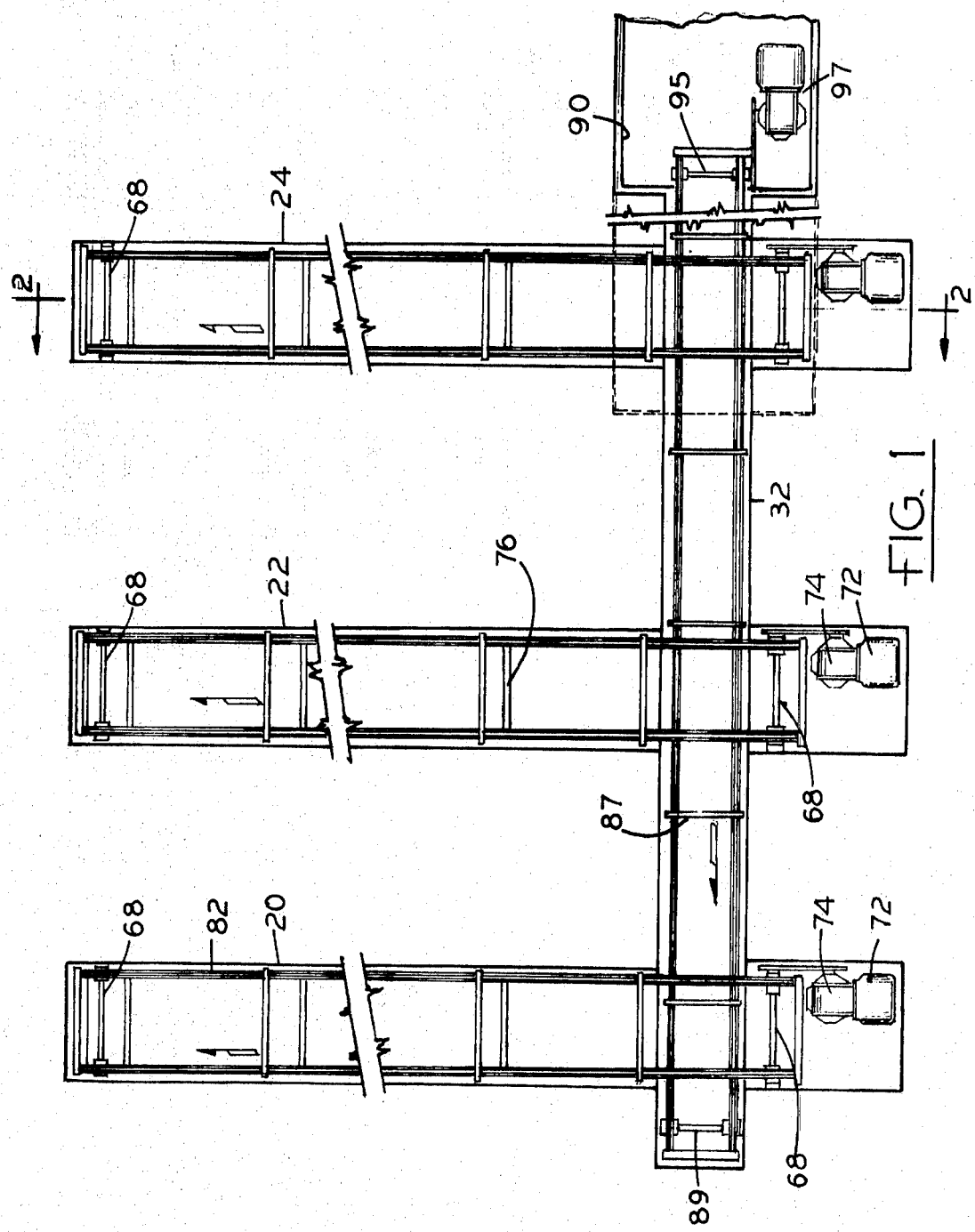
FIG. 1 is a schematic plan view of several lateral trenches and a trunk trench embodying the invention.

In FIG. 1, there is shown lateral trenches 20, 22, 24 which may extend along, between, or underneath automated machine tool line ups in a production center, and a trunk trench 32 adapted to serve the lateral trenches. As shown, more particularly in FIGS. 2 and 3, each lateral trench comprises a sheet metal liner 26 having a 45 degree V bottom 28, forming an inclined channel 30 leading to a similar but deeper trunk trench 32. The liner is provided with side angles 34 resting on shoulders 36 in trenches formed in the concrete flooring. The upper edges of the liners are provided with angle members 38 having lateral portions slightly below floor level and upon which floor grills 40 rest, set in framing 42. The angle members 38 may have offsets 44 to receive removable angle deflectors or shed sheets 46 tending to deflect material falling through the grill towards the center of the trough, and protecting the link chains and sprockets 48 and 50 located therebeneath from abrasive action of metal chips and the like discharged into the trough.

At a suitable depth below the floor level, the side members of the liner are provided with inwardly extending flanges 52 and 54 upon which is supported a series of wedge grids 56, such grids being formed of a plurality of wedge bars closely spaced so as to screen out course material, while permitting the free flow of liquids and fines therethrough. Such grids in sections, may extend the length of the lateral trough, or be interrupted by impervious plates. One form of such wedge grids or screens appears in Johnson U.S. Pat. No. 2,129,428.

Above the grids 56 is provided a pair of sprocket chains 60 and 62 running on sprockets such as 64 and 66 disposed on shafts 68 and 70, the latter being adjustably positioned as indicated at 71 to provide suitable tension, while the shaft 68 is power driven by a motor 72 operating through a speed reducer 74 so as to provide scraper movement at a rate in the order of about five feet per minute. At uniformly spaced intervals, the chains 60 and 62 are provided with scraper bars 76 adapted to wipe along the grids 56 to continuously remove solids trapped thereon such as indicated at 78 whereby to keep the grids 56 open to the flow of liquids. The return reaches of the chains ride on guide bars 80 supported on angle members 82, on the sidewalls.

Figure 2:
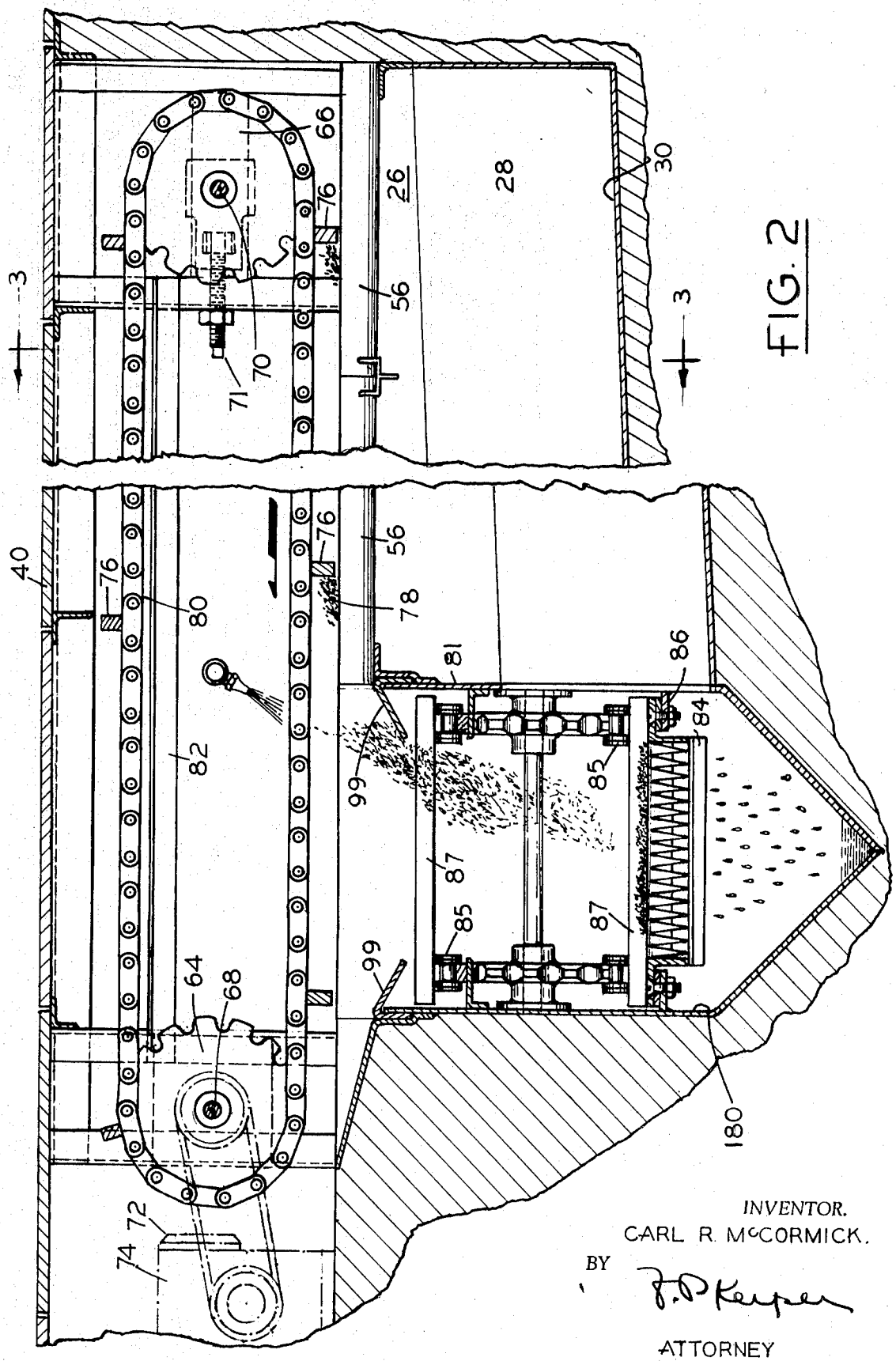
FIG. 2 is a sectional view taken through one of the laterals substantially on the line 2–2 in FIG. 1.
Figure 3:
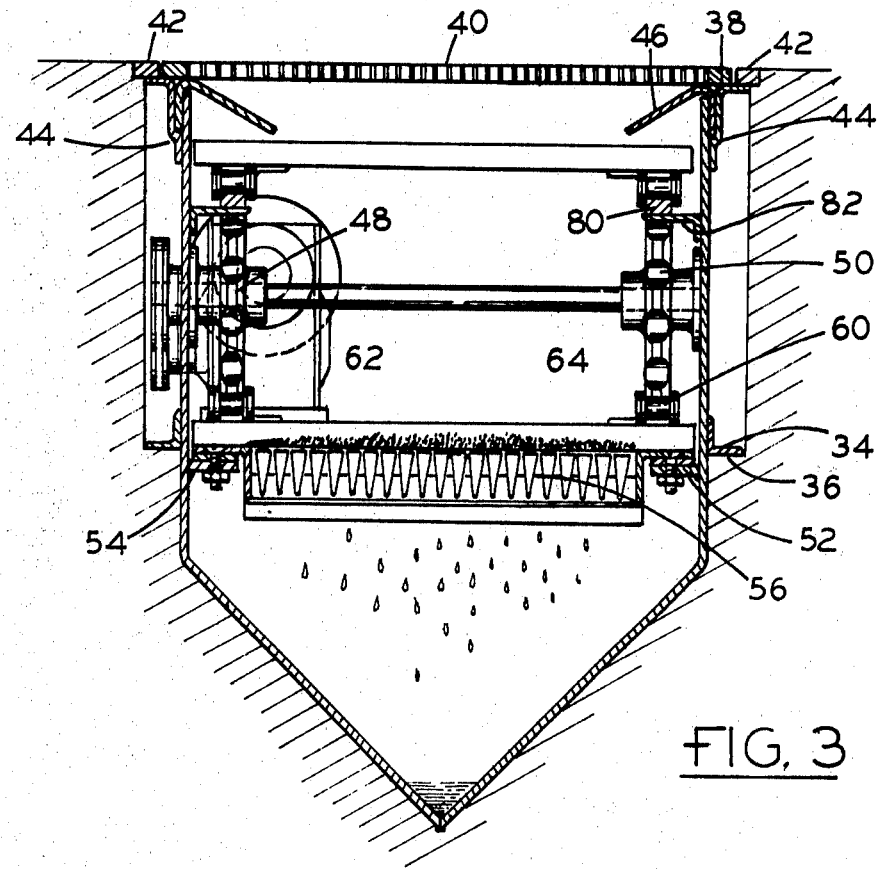
FIG. 3 is a transverse section taken on the line 3–3 of FIG. 2.

As is seen in FIG. 2, each lateral leads into a trunk trench comprising a liner including side members 180 and 81. At a level below the grids 56, and above the lower end of the bottom of the trough 30, and within the trench 32, there is provided wedge grids 84 supported on flanges side rests 86 which grids receive the discharge from the scraping of the grids 56 in the laterals. As before, the bottom of the trench is provided with a V bottom with sides at about 45° inclination whereby to concentrate the flow in a relatively deep valley whereby flow is promoted, and a minimum of pitch over the overall length suffices.

As in the lateral trenches, the trunk trench is provided with a pair of sprocket chains 85 carrying scrapers 87 and extending from an adjustable sprocket shaft 89 to a motor driven shaft 95, driven at slow speed by a ratio motor 97. As before the deflectors 99 protect the running gear from the solids 78 discharged from the laterals onto the grids 84. During the travel of the solids any liquids have adequate time to flow through the grids into the V bottom of the trench.

As is shown in FIG. 4 the trough of the trunk trench discharges into an open tank 90 having an inclined V bottom 91 from which the liquid, freed of solids of any substantial size is pumped as at 93 to a clarification system where the cutting and cooling fluids may be reclaimed and separated from the finer suspended solids. At the same time, the grid extends to an elevating scraper carrier 92 which lifts the screened solids to ground level and where it is discharged into a bin or conveyance 94 for transport from the premises, or for further separation, removal of suitable metallic chips and the like from the other waste.

Figure 5:
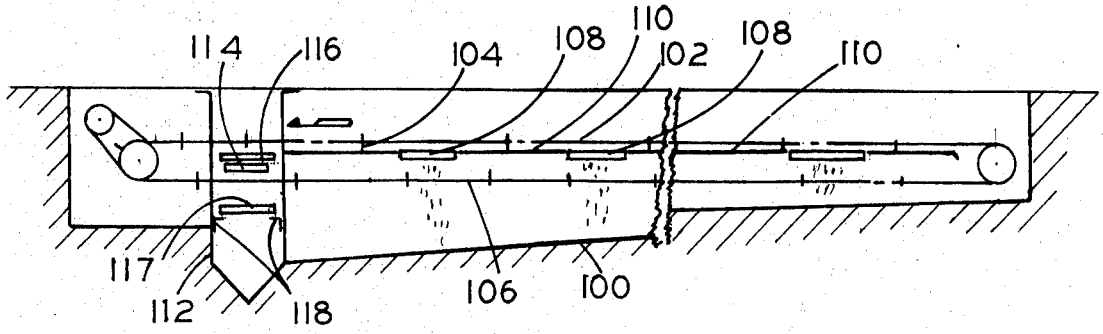
FIG. 5 is a diagrammatic view of an alternative arrangement for a lateral trench.

In FIG. 5 there is shown a modified arrangement whereby the lateral trenches may be more shallow. As shown the lateral trench 100 may be arranged so that the upper reaches 102 of the chains are provided with scraper bars 104 on the underside, and the return reaches 106 of the chains are disposed below the grids 108. As indicated the grids 108 may be spaced apart by flat plates 110. Similarly the trunk trench 112 may have the filter grid 114 disposed below the upper reach of the chain which carry the scraper bars on the underside as indicated at 116, and the return reaches with the bars 117 may be disposed below the grid 114, and ride on guides supported on angle members 118. In this manner the depth of the trench may be reduced.

In practice, by screening out all but the fines along the length of trenches, the liquid and material capable of suspension and easy flow with the liquid are capable of easy flow along the V bottom of the trench, the gradient of which may be as little as a quarter of an inch per foot, so that trenches may be of extended length without excessive depth.

It will be seen that the shed members 46 and 99 are readily removed to provide access to the running gear for its removal, as well as access to the grid members 56, which may also be removable, or replacement. The grids may be removed without removing shed sheets or conveyor.

From the foregoing it will be seen that the handling of industrial waste from a relatively large area is accommodated expeditiously, the waste being carried to a common discharge area where it may be treated, and the liquids reclaimed and sent back to machine tool lineups for reuse.

While an embodiment and variations of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

I claim:

1. An industrial waste handling system comprising an elongated lateral trench liner adapted to be disposed in a floor trench substantially flush with and extending below the floor, said liner comprising spaced parallel side plates having downwardly and inwardly inclined lower sections joined to form a V bottom, said V bottom having a length wise gradient sufficient to promote flow of liquids and matter capable of suspension in the liquid from one end to a discharge point at the other end, shoulder means on the sidewall exteriors for supporting the side plates within the trench with the upper edges of the plates close to floor level, internal filtergrid support shoulders extending horizontally along the inside walls below floor level, filter grids supported on said filter grid support shoulders, sprocket and chain means disposed on opposite sides of the side plates and extending substantially the length of the trench liner, transverse scraper bars carried by the chain means at a level to scrape the upper surface of said filter grids, and power means to drive said sprocket and chain means to move said scraper bars slowly from the one end to the discharge end.

2. A system according to claim 1 wherein a second trench liner is disposed transversely of and at the discharge end of the lateral liner, and wherein the second trench liner is provided with substantially horizontal conveyor means disposed below and adapted to receive the discharge from the lateral scraper bars, and a V bottom having a lengthwise gradient disposed below and adapted to receive liquid discharge from the lateral V bottom.

3. A construction as set forth in claim 1 wherein the grid liners along the upper edges is provided with a lengthwise open tab slot, and in which lengthwise inclined side aprons having means slidably disposed in the slots extend over the chain means on opposite sides of the liner.

4. A construction as set forth in claim 3 wherein the open top slot is formed by an angle section member comprising two flanks at right angles, one of which has an offset portion offset in a direction opposite to that of the other flank, and wherein the offset is secured to the outside face of the liner with other flanges disposed laterally of the upper edge of the liner side.

5. A construction as set forth in claim 1 wherein the upper edges of the side liners have outwardly extending lateral flanges for the support of grills at floor level.

6. A construction as set forth in claim 1 wherein the lower V bottom sections are disposed at a right angle to each other.